(12) United States Patent
Filipp

(10) Patent No.: US 8,579,347 B2
(45) Date of Patent: Nov. 12, 2013

(54) SEAM SPACERS FOR USE WITH DECORATIVE STITCHING OF VEHICLE INTERIOR COMPONENTS

(75) Inventor: William Filipp, Shelby Township, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 65 days.

(21) Appl. No.: 13/314,295

(22) Filed: Dec. 8, 2011

(65) Prior Publication Data

US 2013/0147228 A1 Jun. 13, 2013

(51) Int. Cl.
*B62D 25/14* (2006.01)

(52) U.S. Cl.
USPC ............. 296/1.08; 296/70; 112/417; 29/91; 29/91.1

(58) Field of Classification Search
USPC .......... 296/1.08, 1.09, 70; 112/417, 418, 439, 112/440; 264/258; 428/58, 61, 102, 104, 428/105; 29/91, 91.1
See application file for complete search history.

(56) References Cited

U.S. PATENT DOCUMENTS

| | | | |
|---|---|---|---|
| 3,925,861 A * | 12/1975 | Tillner | 24/1 |
| 4,593,418 A * | 6/1986 | Simon | 2/275 |
| 4,711,190 A | 12/1987 | Smith | |
| 4,863,776 A * | 9/1989 | Sternlieb | 428/102 |
| 5,017,413 A * | 5/1991 | Moschini | 428/61 |
| 5,382,398 A | 1/1995 | Draxlmaier, Jr. | |
| 7,052,566 B2 | 5/2006 | Wright et al. | |
| 7,278,363 B2 * | 10/2007 | Wieczorek et al. | 112/475.06 |
| 7,588,814 B2 | 9/2009 | Olley et al. | |
| 7,922,956 B1 | 4/2011 | Scheidmantel et al. | |
| 2003/0145485 A1 * | 8/2003 | Chen | 36/3 A |
| 2010/0193108 A1 | 8/2010 | Aoyama et al. | |

FOREIGN PATENT DOCUMENTS

| | | |
|---|---|---|
| DE | 9006029 | 8/1990 |
| DE | 102004053133 | 5/2006 |
| DE | 102009000559 | 8/2010 |
| EP | 1816018 | 8/2007 |
| JP | 60018040 | 2/1985 |

OTHER PUBLICATIONS

International Search Report PCT/US2012/068508, Feb. 27, 2013, 4 pages.
Written Opinion for PCT/US2012/068508, Feb. 27, 2013, 6 pages.

* cited by examiner

*Primary Examiner* — Glenn Dayoan
*Assistant Examiner* — Jason S Daniels
(74) *Attorney, Agent, or Firm* — Reising Ethington P.C.

(57) ABSTRACT

A vehicle interior component including decorative stitching along a stitch path includes a seam spacer located between a component substrate and an overlying decorative covering. At least a portion of the seam spacer lies along the stitch path and supports the decorative covering therealong, where the covering may include a reduced thickness portion due to the decorative stitching. The seam spacer can have any number of configurations to prevent visual defects along the stitch path and/or to cause the appearance of simulated seams to be more realistic. The seam spacer may be attached to the covering at the same time the decorative stitching is sewn through the covering.

19 Claims, 3 Drawing Sheets

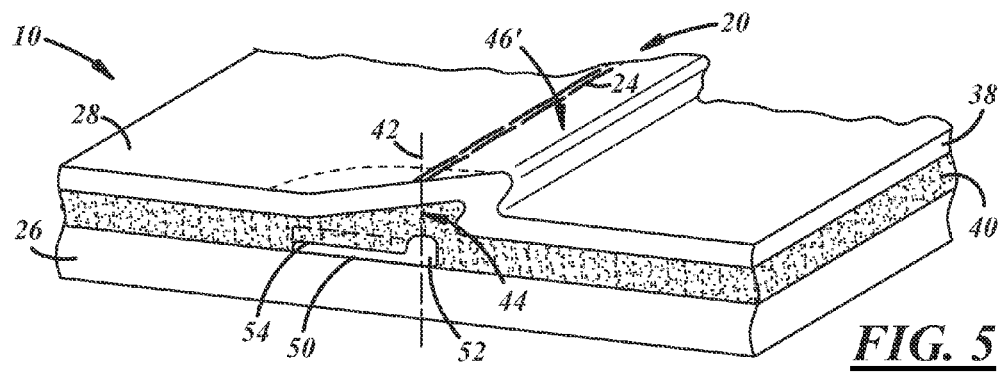
*FIG. 5*
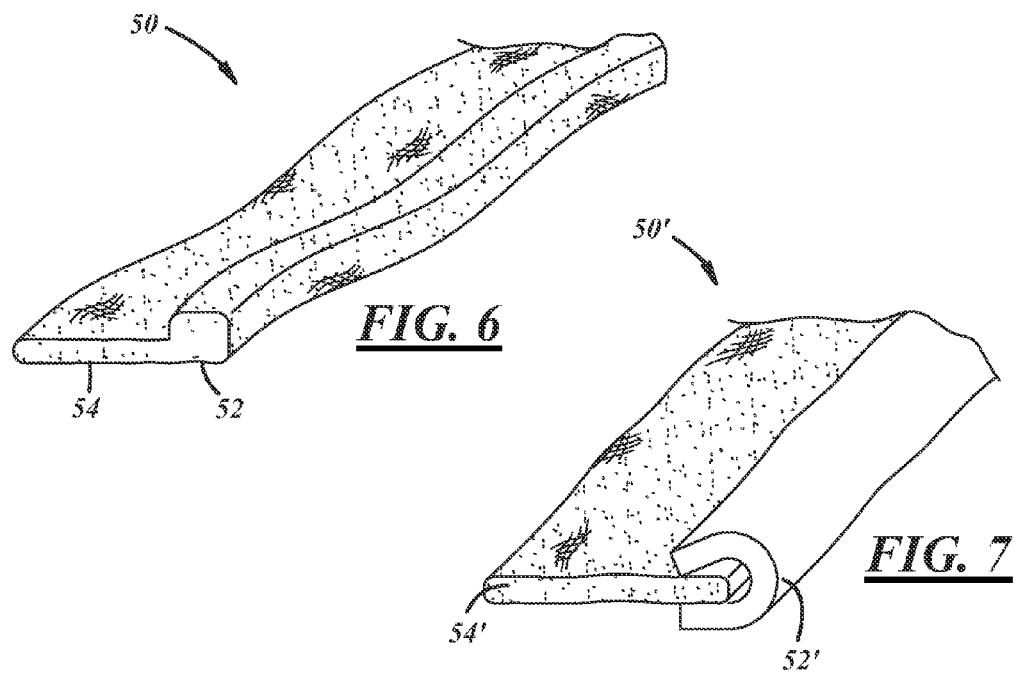
*FIG. 6*
*FIG. 7*
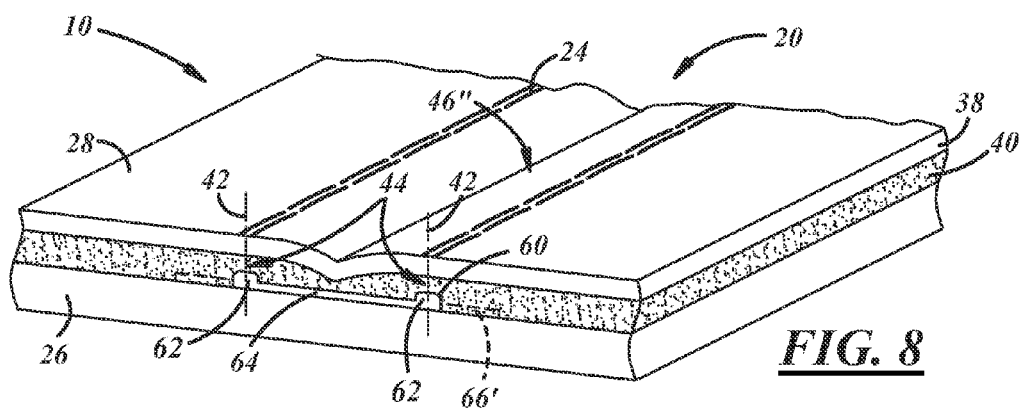
*FIG. 8*

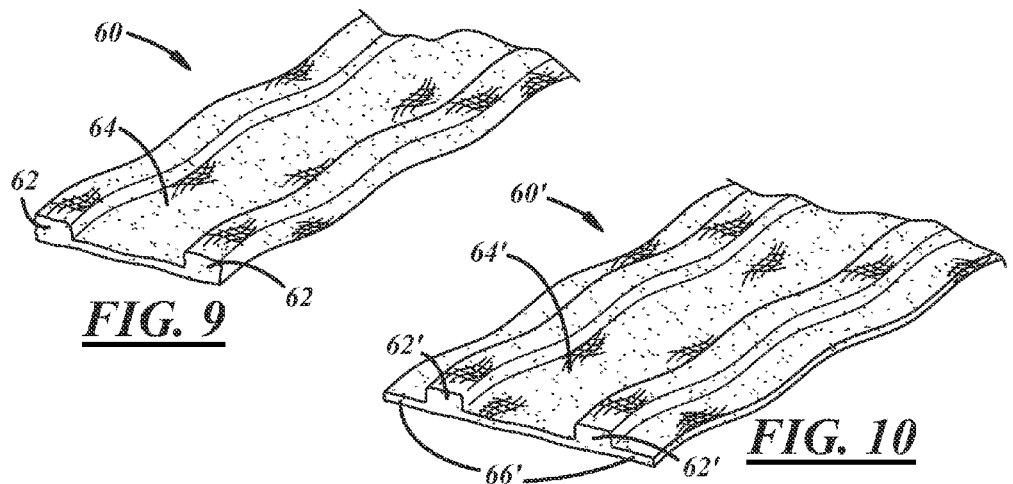
*FIG. 9*
*FIG. 10*
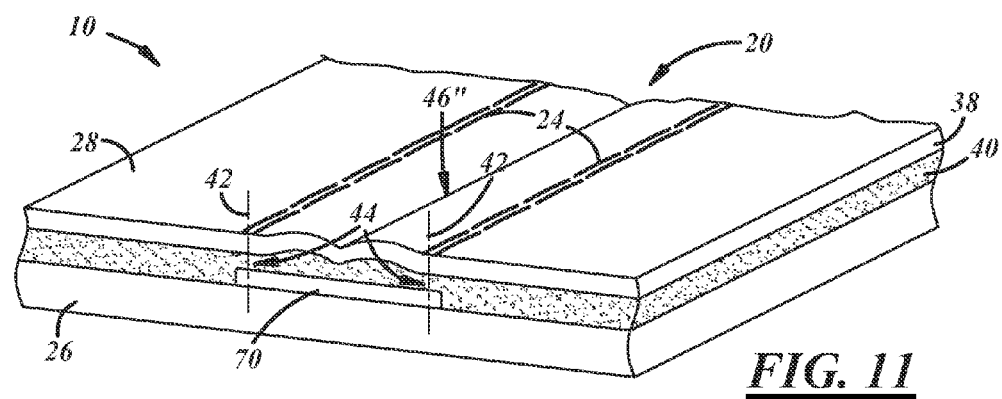
*FIG. 11*
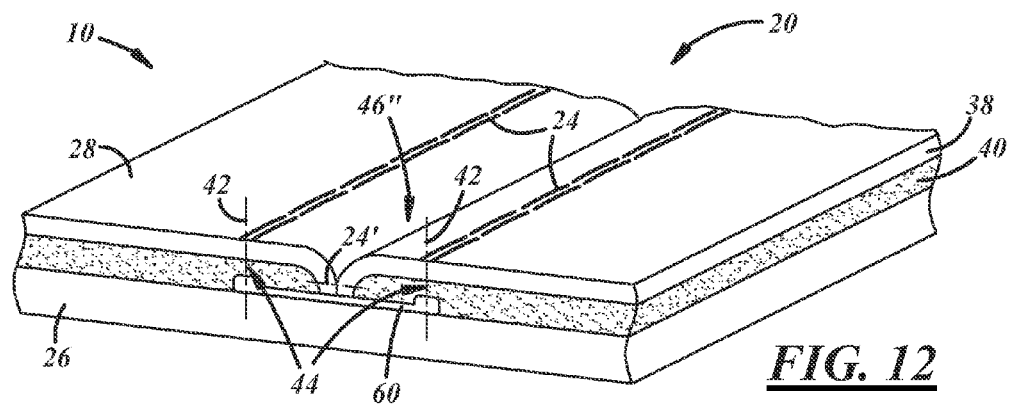
*FIG. 12*

SEAM SPACERS FOR USE WITH DECORATIVE STITCHING OF VEHICLE INTERIOR COMPONENTS

TECHNICAL FIELD

The present disclosure relates generally to vehicle interior coverings and, more particularly, to vehicle interior coverings that include decorative stitching.

BACKGROUND

Vehicle interiors utilize various types of decorative components to provide a desired aesthetic. Certain types of materials and components, such as leather or genuine wood trim, may traditionally provide a vehicle interior with a luxurious feel because the cost of such materials is usually high, making them affordable only to purchasers of expensive vehicles. One distinctive feature of leather trim materials is what may be termed a "cut-and-sew" look, where pieces of leather material are hand-sewn together, often with decorative stitching, to form a covering to fit the contours of various types of interior components. Some efforts have been made to simulate such a hand-sewn look to make it more affordable for use in less expensive vehicles.

U.S. Pat. No. 7,922,956 to Scheidmantel et al. describes one technique that purports to simulate a cut-and-sew look. The method taught by Scheidmantel includes molding a component from a plastic material using a mold that has the shape of a simulated sewn joint formed in the mold surface. When removed from the mold, the molded component includes a molded-in simulated sewn joint in the form of a pair of ridges with an indentation between the ridges. Scheidmantel teaches adding a thread-stitched seam parallel to the ridges to simulate a sewn joint.

SUMMARY

According to one embodiment, a vehicle interior component is provided that includes a substrate having an outer surface, a decorative covering, a seam formed in the decorative covering, and an elongated seam spacer located between the substrate outer surface and the decorative covering. The decorative covering is disposed over the substrate outer surface, and the seam includes a line of decorative stitching sewn through the covering along a stitch path. The seam spacer is arranged along the stitch path so that it supports the covering directly beneath at least a portion of the line of decorative stitching.

In another embodiment, the decorative covering includes a reduced thickness portion along the stitch path, and at least a portion of the seam spacer is located at the reduced thickness portion.

In another embodiment, the decorative covering includes a decorative skin layer and an inner layer. The inner layer includes a reduced thickness portion along the stitch path, and at least a portion of the seam spacer is located at the reduced thickness portion.

In another embodiment the vehicle interior component includes a ridge feature formed in the decorative covering, and at least a portion of the ridge feature is generally parallel with the stitch path.

In another embodiment, the seam spacer is attached to the decorative covering.

In another embodiment, the line of decorative stitching is sewn through the seam spacer so that the seam spacer is attached to the decorative covering.

In another embodiment, the seam spacer has a non-uniform thickness and the thickest portion of the cross-section is located along the stitch path.

In another embodiment, the seam spacer is formed from a textile material.

In another embodiment, the line of decorative stitching is part of a seam that includes functional stitching.

In another embodiment, a vehicle instrument panel is provided that includes any one or more of the features of the previously listed embodiments, separately or combined.

According to another embodiment, a method of making a vehicle interior component having decorative stitching includes the steps of: (a) sewing a line of decorative stitching through a decorative covering along a pre-determined stitch path; (b) attaching a seam spacer to the decorative covering along the stitch path at a covering inner surface; and (c) disposing the decorative covering over a vehicle interior component substrate so that the seam spacer separates the covering inner surface from the substrate along at least a portion of the stitch path.

In another embodiment, the step of sewing and the step of attaching the seam spacer are performed simultaneously so that the line of decorative stitching attaches the seam spacer to the covering.

In another embodiment, the method also includes the step of forming a ridge in the decorative covering that is generally parallel with at least a portion of the stitch path.

In another embodiment, the step of forming the ridge is performed before the step of sewing the line of decorative stitching.

In another embodiment, the method also includes the step of providing the decorative covering, before the step of sewing, so that it includes at least one layer of material that is compressed by the line of decorative stitching, thereby forming a reduced thickness portion in the covering along the stitch path during the sewing step.

In another embodiment, the method also includes the step of locating a thickest portion of the seam spacer at the reduced thickness portion of the covering during the step of attaching, so that the combined thickness of the covering and seam spacer along the stitch path is about the same as a nominal covering thickness or greater than the nominal covering thickness.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more illustrative embodiments of the invention will hereinafter be described in conjunction with the appended drawings, wherein like designations denote like elements, and wherein:

FIG. 5 is a cross-sectional perspective view of a vehicle interior component, showing a seam spacer arranged along the stitch path of a simulated deck seam, according to one embodiment;

FIG. 6 is a perspective view of a seam spacer having a non-uniform thickness that may be used in the embodiment of FIG. 5;

FIG. 7 is a perspective view of a two-piece seam spacer having a non-uniform thickness that may be used in the embodiment of FIG. 5;

FIG. 8 is a cross-sectional perspective view of a vehicle interior component, showing a seam spacer arranged along dual stitch paths of a simulated French seam, according to one embodiment;

FIG. 9 is a perspective view of a seam spacer having parallel portions that may be arranged along dual stitch paths such as those shown in FIG. 8;

FIG. 10 is a perspective view of another seam spacer having parallel portions that may be arranged along dual stitch paths such as those shown in FIG. 8;

FIG. 11 is a perspective cross-sectional view of a vehicle interior component, showing another embodiment of a seam spacer arranged along dual stitch paths of a simulated French seam; and FIG. 12 is a perspective cross-sectional view of a vehicle interior component, showing a seam spacer arranged along dual stitch paths of a simulated French seam that includes functional stitching.

DETAILED DESCRIPTION OF EMBODIMENT(S)

The following description is directed at various embodiments of vehicle interior components that include decorative stitching and structures and methods for ensuring that the decorative stitching, typically included as a desirable aesthetic feature of such components, does not cause other undesirable aesthetic defects therein. Seam spacers may be used with decorative coverings to support such coverings over a substrate at reduced thickness portions in the coverings that may coincide with the location of the decorative stitching. These seam spacers can help prevent local sagging or sinking of the covering at the reduced thickness portions and/or they can be used to form bulges or raised areas in the coverings to help simulate a fold in the covering as part of a simulated seam.

Figure 1:
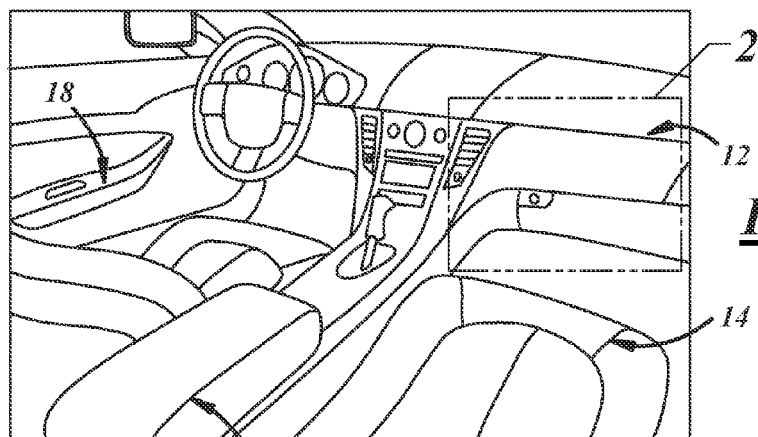
FIG. 1 is a perspective view of a vehicle interior, showing various vehicle interior components that may include decorative stitching.

Referring to FIG. 1, a vehicle interior is shown to illustrate various examples of vehicle interior components that may include coverings with decorative stitching. Instrument panel assembly 12, seat assembly 14, console assembly 16, and door panel assembly 18 may all include decorative coverings disposed over and/or attached to their respective component substrates. The arrows in the figure also point to example locations for seams and/or decorative stitching for each of the components. The coverings and seam spacers disclosed herein may be used with any other interior component as well, such as steering wheel assemblies, shifter assemblies, etc.

Figure 2:
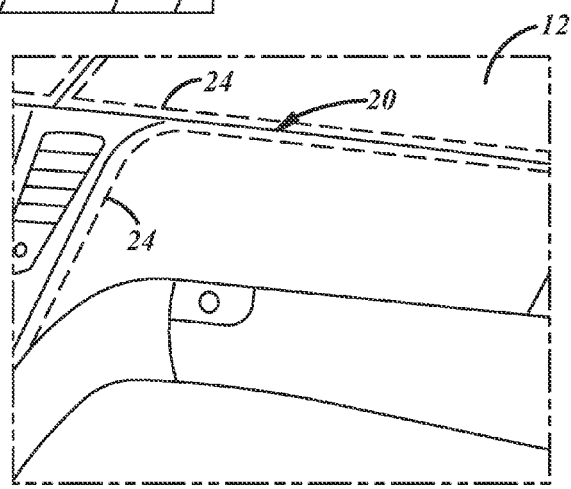
FIG. 2 is an enlarged view of the instrument panel assembly of FIG. 1, including decorative stitching according to one embodiment.

FIG. 2 is an enlarged view of a portion of the instrument panel assembly 12 of FIG. 1. The illustrated instrument panel 12 includes one or more seams 20, as shown. Seam 20 may be a functional seam where two portions of covering material are attached to each other, it may be a simulated seam where one or more line(s) of decorative stitching 24 are provided either alone or in combination with other features that simulate a seam, or it may be a functional seam that includes decorative stitching 24. Examples of different types of seams 20 will be detailed below.

Figure 3:
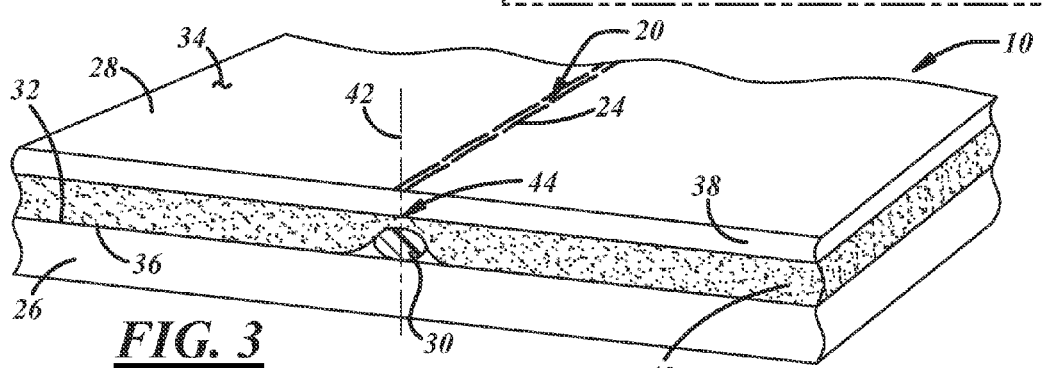
FIG. 3 is a cross-sectional perspective view of a vehicle interior component, showing a seam spacer arranged along the stitch path of a simulated seam, according to one embodiment.

Referring now to FIG. 3, a cross-sectional view of one example of a vehicle interior component 10 is shown with a simulated seam 20 and decorative stitching 24 formed therein. Component 10 includes a substrate 26, a decorative covering 28 disposed over the substrate, and a seam spacer 30 located between the substrate and the covering. The substrate 26 forms the overall three-dimensional shape of the particular vehicle interior component and includes an outer surface 32. In the case of an instrument panel, the substrate 26 is at least partly structural in nature in that it supports and/or provides attachment locations for other vehicle components, like HVAC components, airbag components, etc. It can be formed from any suitable material such as filled or unfilled plastics, metals, or combinations thereof. In one embodiment, substrate 26 is constructed from a material that includes a thermoplastic olefinic material such as polypropylene, and may be reinforced with 20-30% glass fiber. The substrate 26 thickness may range from about 2.0 mm to about 4.0 mm where plastic materials are used in its construction. Outer surface 32 may be generally smooth and continuous with the exception of openings or other functional features. In one embodiment, the substrate does not include any standing or proud features such as ribs or bosses along the outer surface at or near the seam 20.

Decorative covering 28 overlies the substrate 26 to provide a desired aesthetic and may be attached to the substrate with a suitable adhesive or by other means. Covering 28 includes an outer surface 34 and an opposite inner surface 36 that faces the substrate outer surface 32 as shown. At least a portion of inner surface 36 is in contact with the substrate outer surface 32. In this particular embodiment, covering 28 includes a decorative skin layer 38 and an inner layer 40 sandwiched between the skin layer 38 and the substrate 26. In the bi-layer construction shown, the skin layer 38 includes the covering outer surface 34, and the inner layer 40 includes the covering inner surface 36. In other embodiments, covering 28 may be formed from a single layer of material or may include one or more additional layers between the skin and inner layers 38, 40.

Skin layer 38 is generally decorative and may be constructed from a pliable material such as those typically used in vehicle interiors, including TPO, TPE, PVC, PUR, leather, simulated leather, or other types. Material selection may be based on a number of factors, including the desired type of texture for outer surface 34, the tactile feel of the material, cost, processability, or others. Inner layer 40 may be constructed from a compressible foam material to provide a cushioned feel to the covering 28 and to the vehicle component 10. Examples of foam materials for inner layer 40 include polyolefin-based foam, polyurethane foam, acrylic-based foam, or polyester foam, to name a few. Other non-foam materials such as felt or textile fibers may be used as well. Layers 38 and 40 may be initially provided as separate unattached layers for assembly to substrate 26, or they may be co-extruded, laminated, adhesively bonded or otherwise attached to each other to form covering 28 separately from substrate 26.

Individual layer thicknesses may vary, but the overall nominal thickness of covering 28 may range from about 0.2 mm to about 6 mm, in accordance with the individual layer thicknesses, and preferably ranges from about 1.0 mm to about 4.0 mm. The thickness of skin layer 38 may range from about 0.2 mm to about 1.0 mm, and preferably ranges from about 0.3 mm to about 0.7 mm. The selected skin layer thickness depends on several variables such as material type, manufacturability, and desired aesthetic, to name a few. The thickness of inner layer 40 may range from about 0.5 mm up to about 5.0 mm or higher, depending on the desired tactile feel of the interior vehicle component. In one embodiment, covering 28 has an overall thickness of about 2.0 mm, where the skin layer 38 is about 1.0 mm thick and the inner layer 40 is about 1.0 mm thick. In another embodiment, the skin layer is about 0.5 mm thick, and the inner layer is about 3.5 mm thick, so that the overall covering thickness is 4.0 mm. Of course, these are non-limiting examples, as there are several suitable combinations of layer thicknesses. These example ranges are nominal ranges, as some covering features can locally affect covering thickness.

Seam 20 is formed in covering 28 so that it is visible from the interior of the vehicle. Seam 20 may be a functional seam where two separate portions of a covering are attached together, or it may be a simulated seam. The particular seam 20 shown in FIG. 3 is a simulated seam that includes a line of decorative stitching 24 along a stitch path 42, represented in FIG. 3 by a dashed line at the cross-section. The stitch path 42 represents the location of the line of decorative stitching along and through the opposite surfaces 34, 36 of the covering 28, which may be a pre-determined location. The stitch path 42 and corresponding line of decorative stitching can be in any curvilinear shape along the covering surfaces—i.e., the term "line" is not meant to limit the shape of the stitch path 42 to a straight line. Skilled artisans will recognize that the line of decorative stitching comprises multiple interconnected loops of thread that pass through the covering 28 along the stitch path 42. The portion of the covering 28 that lies along the stitch path may be at least partially compressed by these loops of thread during the sewing operation as the sewing equipment maintains proper thread tension. As shown in FIG. 3, a reduced thickness portion 44 of the covering 28 may result. This may particularly be the case where the covering includes a compressible foam inner layer 40. Reduced thickness portion 44 is reduced in thickness relative to the nominal covering thickness and generally lies along the stitch path 42.

Seam spacer 30 is a piece of material that is arranged along the stitch path between the substrate and the decorative covering that helps to support the covering directly beneath at least a portion of the line of decorative stitching. Spacer 30 may be provided to account for at least a portion of the difference in the nominal thickness of the covering 28 and the reduced thickness at portion 44. The seam spacer 30 may have an elongated shape and/or have a generally uniform cross-section along its length. In the embodiment of FIG. 3, the seam spacer 30 includes a round cross-section, which can be circular, elliptical or otherwise round in shape. In some cases, the seam spacer 30 is more compressible than the substrate but less compressible than the covering. Thus a seam spacer 30 having a circular cross-section before being placed between the covering and the substrate may assume an elliptical or flatter shape when assembled into the vehicle component 10. Other seam spacer cross-sectional shapes will be described in further detail in conjunction with other figures.

Seam spacer 30 can be made from nearly any material that may be selected based on several factors such as relative compressibility, cost, ease of shaping it to follow the stitch path, desired attachment method when applicable, or other factors. For example, seam spacer compressibility may be tailored so that it sufficiently supports the covering directly beneath the reduced thickness portion of the covering, and so that the seam spacer "gives" when pressed on. A material that compresses more than another material under the same load has a higher relative compressibility than the other material. The overall desired effect may be that a simulated seam 20 feels like a functional seam because when pressed by hand, the seam 20 feels as if an edge of material is folded under itself at the seam. Textile materials are one type of material suitable for use as seam spacers 30. Textile materials include but are not limited to any interlaced, woven, or pressed strands of natural or synthetic fibers such as cotton, wool, polyester, nylon, acrylic, etc. Other suitable seam spacer materials include synthetic foam materials, semi-rigid plastics, elastomers, or certain metals in some cases. The seam spacer 30 can also include more than one type of material, such as a plastic portion attached to a felt portion, for example.

Seam spacer 30 may be attached to the covering 28, prior to the covering being disposed over the substrate 26, using any suitable technique sufficient to hold the spacer 30 in place until the component 10 is assembled. In one embodiment, the seam spacer 30 is sewn onto covering 28 at inner surface 36 so that at least a portion of the seam spacer 30 lies along the stitch path 42. In one particular embodiment, the decorative stitching 24 attaches the seam spacer 30 to the covering 28. In that case, decorative stitching 24 is partly functional, in that the lower end of the stitching passes through the seam spacer to attach it to the inner surface 36 of the covering 28, though still not part of a functional seam (in which two separate portions of covering material are joined). Seam spacers formed from textile materials may be particularly suitable in embodiments in which the seam spacer 30 is sewn to the covering, as textiles may be typically compatible with sewing equipment. Of course, other types of seam spacer materials can be attached to the covering by sewing. The seam spacer can be attached to the covering by other means as well, such as adhesive, hook and loop fasteners, melt bonding, separate fastening elements, frictional fit, etc. In one embodiment, the seam spacer 30 is adhesively attached to the covering and may be provided as a peel-and-stick element.

Figure 4:
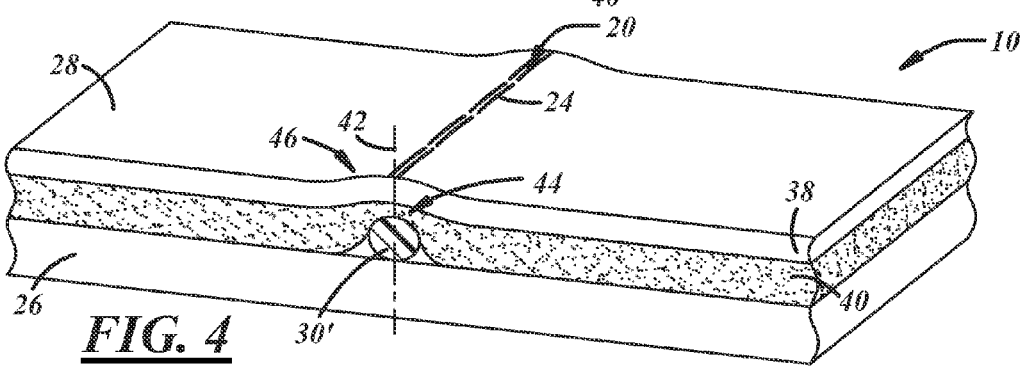
FIG. 4 is a cross-sectional perspective view of a vehicle interior component, showing another seam spacer arranged along the stitch path of a simulated seam, according to another embodiment.

FIG. 4 illustrates an example of a vehicle component 10 that includes a simulated seam 20 with a slightly different configuration. The example of FIG. 4 is similar to that of FIG. 3, with one difference being that the seam spacer 30' has a larger cross-section than that of the seam spacer 30 of FIG. 3. The seam spacer 30' is configured so that it accounts for the reduced thickness portion 44 of the covering and includes additional thickness, thus creating a raised feature or visible ridge 46 as part of seam 20. Ridge 46 may help simulated seam 20 appear more like a functional seam, as functional seams often have edges of joined material folded under the material at the seam, resulting in a similar bulge or ridge along the seam. In one embodiment, the seam spacer may be located along the inner surface of the covering along a stitch path that does not have a corresponding reduced thickness portion, either because the inner layer is not compressible, or for other reasons. In such an embodiment, the seam spacer may be provided to help form or shape a ridge in the finished component.

In another embodiment, shown in FIG. 5, the vehicle component 10 includes a simulated ridge seam 20. This type of simulated seam can appear as if one portion of material has an edge folded under and sewn over the top of an edge of an adjacent portion of material. This embodiment includes a pre-formed ridge 46' that may be formed in the covering 28 generally parallel to the pre-determined stitch path 42 prior to the covering 28 being disposed over the substrate 26. Ridge

46' is an upstanding or proud ridge and may be a more distinct or more sharply defined feature than the more subtle ridge 46 of FIG. 4. Ridge 46' can be formed in thermoplastic or other thermoformable covering materials by a thermoforming process, some examples of which will be described below.

In this embodiment, seam spacer 50, while having a uniform cross-section along its length, has a cross-section that is non-uniform in thickness and non-symmetric with respect to the stitch path 42. In this example, main portion 52 of spacer 50 that lies along the stitch path 42 is thicker than auxiliary portion 54 that extends away from the stitch path. The cross-sectional shape of the seam spacer 50 may be tapered from thick to thin from main portion 52 toward auxiliary portion 54, or the two portions may simply have two different thicknesses. In the illustrated embodiment, the main portion 52 is the thickest portion of the seam spacer. Other embodiments, including those shown in FIGS. 3 and 4, may also be arranged so that the thickest portion of the seam spacer is located along the stitch path 42, but this is not necessarily always the case. The amount of taper or the difference in the thickness from main portion 52 to auxiliary portion 54, along with the total width of the seam spacer 50, may be used to tailor or modify the finished appearance of pre-formed ridge 46'. For example, auxiliary portion 54 may have a thickness that is the same as or greater than the thickness of the main portion 52 to increase the prominence of the ridge where it extends away from the stitch path 42 to simulate a greater amount of material overlap in the simulated seam 20 (shown as dashed lines in FIG. 5). Auxiliary portion 54 may be provided for other reasons, such as for ease of handling a narrower main portion 52 in a manufacturing environment.

Example seam spacers are illustrated separately in FIGS. 6 and 7 and may be used with the embodiment of FIG. 5 or with other embodiments. FIG. 6 shows one example of seam spacer 50 having a non-uniform thickness across its width. In one embodiment, seam spacer 50 is constructed from a textile material comprising woven fibers with a greater number of woven layers at the main portion 52 than at the auxiliary portion 54. Other textile manufacturing techniques may be used to form a seam spacer with a non-uniform thickness. For example, a seam spacer having a non-uniform thickness such as seam spacer 50 could be formed from an elongated piece of material having a widthwise edge rolled or folded onto itself. FIG. 7 illustrates an example of a seam spacer 50' constructed in two pieces, where main portion 52' is separate piece, such as a plastic extrusion, that clips or slides onto an edge of auxiliary portion 54'. Skilled artisans will appreciate the vast number of seam spacer configurations that are possible in view of these teachings.

Turning now to FIG. 8, the vehicle component 10 may include a simulated French seam 20. This type of simulated seam can appear as if two portions of material are sewn together with the extra material of each portion folded under and sewn to itself. This embodiment includes a pre-formed ridge 46" that may be formed in the covering 28 generally parallel to the pre-determined stitch path 42 prior to the covering 28 being disposed over the substrate 26. This version of ridge 46" is a depression or downstanding ridge, and may also be formed in a thermoforming process. Simulated seam 20 of FIG. 8 includes two lines of decorative stitching 24 along spaced apart stitch paths 42, equally spaced from and parallel to ridge 46". Seam spacer 60 has a non-uniform thickness, though it is symmetric with respect to the center of the seam 20. In this example, the seam spacer 60 includes two main portions 62 that lie along respective dual stitch paths 42, with an auxiliary portion 64 connecting the two main portions 62. The main portions 62 are the thickest portions of the seam spacer 60.

Example seam spacers are illustrated separately in FIGS. 9 and 10 and may be used with the embodiment of FIG. 8 or with other embodiments. FIG. 9 shows one example of seam spacer 60 having two spaced apart main portions 62 connected by auxiliary portion 64. This embodiment may be constructed similar to that of FIG. 6, only with an additional main portion at the opposite widthwise edge. FIG. 10 illustrates an example of a seam spacer 60' having additional auxiliary portions 66' extending in a direction away from auxiliary portion 64' to form the widthwise edges of the seam spacer. Portions 66' are also shown as dashed lines in FIG. 8. Portions 66 may be useful for handling seam spacer 60' during manufacturing, such as during sewing operations. Other types of seam spacers are possible with such dual-stitch seams where two reduced thickness portions may be formed in the covering. For example, two separate seam spacers like those in FIG. 1 may be used to support the covering or fill the gap created by the reduced thickness portions. Multi-piece seam spacers, similar to that of FIG. 7 except with two main portions, may also be used.

Turning now to FIG. 11, a simulated French seam 20 similar to that of FIG. 8 is shown. In this embodiment, the seam spacer 70 has a uniform cross-section that spans the distance between the dual-stitch paths 42. The resulting simulated seam 20 includes the downstanding ridge 46" of FIG. 8, but with a more complex overall shape due to the additional bulge created by the spacer 70. This embodiment has some similarity to that of FIG. 4 in that the spacer 70 helps to define the overall shape of the ridge by doing more than filling the gaps resulting from reduced thickness portions 44. The resulting appearance to the simulated French seam may by more realistic due to the appearance that additional material is folded under and sewn to itself.

FIG. 12 illustrates a different type of simulated French seam 20 that includes dual lines of decorative stitching 24, along with functional stitching 24' that joins separate portions of covering material together. Some non-limiting examples of this type of simulated French seam are disclosed in co-assigned U.S. patent application Ser. No. 13/158,967 filed Jun. 13, 2011. The illustrated embodiment shows a seam spacer 60 similar to that of FIG. 9, but other seam spacers may be used, such as the uniform thickness seam spacer of FIG. 11.

The use of seam spacers according to these and other embodiments along covering stitch paths to fill gaps or voids caused by sewing decorative stitching through covering materials may enhance the final appearance of the vehicle interior component by supporting the covering over the substrate at reduced thickness portion(s) so that an undesirable sunken area in the covering is prevented along the stitch path. Such seam spacers may offer the additional advantage of enhancing the illusion of a true seam, such as a deck seam or French seam, by creating additional raised features or bulges in the covering material as if the covering material is folded under at the simulated seam. Additionally, these types of separate seam spacers can be attached to the covering, rather than being molded into the underlying substrate in the form of ribs or other standing substrate features, offering additional manufacturing and design flexibility. For example, different covering designs having simulated seams at different locations along their respective surfaces can be disposed over a common smooth substrate surface. To accomplish the same with ribs molded into the substrates, additional molding tools must be constructed to mold different substrates. In the context of vehicle instrument panels, this means that a common substrate from a single molding tool can be used both with a more plain, lower cost covering for a lower trim level vehicle, and with a more decorative covering, having simulated French seams for example, for a higher trim level vehicle. Of course, substrate ribs may still be utilized along with seam spacers where desired.

One embodiment of a method of making a vehicle interior component having decorative stitching may include the steps of sewing a line of decorative stitching through a decorative covering along a stitch path, attaching a seam spacer to the covering along the stitch path at the inner surface of the covering, and disposing the covering over a component substrate so that the seam spacer separates the covering inner surface from the substrate along the stitch path. The steps of sewing and attaching the seam spacer may be performed simultaneously or separately. The method may further include forming a ridge or a ridge feature in the decorative covering. Such a ridge feature may be formed either before or after the step of sewing. For example, as described in some of the embodiments of vehicle interior components above, the seam spacer may include additional thickness along its width in excess of the thickness necessary to fill the gap formed between the substrate and the covering at the reduced thickness portion of the covering. Disposing a covering with such a seam spacer attached at its inner surface can form a visible ridge in the decorative covering when disposed over the substrate, or it may change the shape of an existing ridge.

Alternatively or additionally, a ridge may be pre-formed in the covering, as mentioned above. In one embodiment, a pre-formed ridge is provided in the covering by a thermoforming process when materials such as TPO or other thermoplastic materials are used in the construction of the covering. In a thermoforming process, the covering is heated and the outer surface of the covering is forced against a die or mold having the desired shape for the ridge formed therein. Such a thermoforming process may or may not be vacuum- or pressure-assisted. Vacuum-assisted thermoforming may be useful when forming a ridge that is undercut as shown in the example of FIG. 5. Thermoforming or vacuum-assisted thermoforming may also be used to impart a grain or surface texture onto the outer surface of the covering in the same or different operation in which a ridge is formed. This type of process may be referred to as in-mold graining or IMG. Pre-formed ridges may be useful in subsequent sewing operations to provide a sewing guide so that the stitch path parallels the ridge.

These example method steps may be part of an overall method having more steps where the individual steps are broken into multiple other steps or additional steps are added before, after, simultaneous with, or between those described above. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle interior component, comprising:
a substrate having an outer surface;
a decorative covering disposed over the substrate outer surface, the decorative covering including a decorative skin layer and a foam inner layer interposed between the substrate and the decorative skin layer;
a seam formed in the decorative covering, including a line of decorative stitching sewn through the covering along a stitch path, wherein the line of decorative stitching comprises interconnected loops of thread and the foam inner layer is compressed by the loops of thread so that the covering has a reduced thickness portion along the stitch path; and
an elongated seam spacer located between the substrate outer surface and the foam inner layer of the decorative covering and arranged along the stitch path so that the seam spacer supports the covering directly beneath at least a portion of the line of decorative stitching.

2. The vehicle interior component of claim 1, wherein the seam spacer is sized to account for the difference between the nominal thickness of the covering and the thickness of the covering at the reduced thickness portion.

3. The vehicle interior component of claim 1, wherein the decorative covering has a bi-layer construction so that the foam inner layer is in contact with the outer surface of the substrate, except at the seam spacer.

4. The vehicle interior component of claim 1, further comprising a ridge feature formed in the decorative covering, wherein at least a portion of the ridge feature is generally parallel with the stitch path.

5. The vehicle interior component of claim 1, wherein the seam spacer is attached to the decorative covering.

6. The vehicle interior component of claim 1, wherein the line of decorative stitching is sewn through the seam spacer so that the seam spacer is attached to the decorative covering.

7. The vehicle interior component of claim 1, wherein the seam spacer has a non-uniform thickness and the thickest portion of the cross-section is located along the stitch path.

8. The vehicle interior component of claim 1, wherein the seam spacer is formed from a textile material.

9. The vehicle interior component of claim 1, wherein the line of decorative stitching is part of a seam that includes functional stitching.

10. A vehicle instrument panel according to claim 1.

11. A method of making a vehicle interior component having decorative stitching, comprising the steps of:
(a) sewing a line of decorative stitching through a decorative skin layer and a foam layer of a decorative covering along a pre-determined stitch path, wherein the line of decorative stitching comprises interconnected loops of thread that compress the foam layer so that the covering has a reduced thickness portion along the stitch path;
(b) attaching a seam spacer to the decorative covering along the stitch path at a covering inner surface, wherein the covering inner surface is provided by the foam layer; and
(c) disposing the decorative covering over a vehicle interior component substrate so that the seam spacer separates the covering inner surface from the substrate along at least a portion of the stitch path.

12. The method of claim 11, wherein steps (a) and (b) are performed simultaneously so that the line of decorative stitching attaches the seam spacer to the covering.

13. The method of claim 11, further comprising the step of: forming a ridge in the decorative covering that is generally parallel with at least a portion of the stitch path.

14. The method of claim 13, wherein the step of forming the ridge is performed before step (a).

15. The method of claim 11, further comprising the step of: locating a thickest portion of the seam spacer at the reduced thickness portion of the covering during step (b) so that the combined thickness of the covering and seam spacer along the stitch path is about the same as a nominal covering thickness or greater than the nominal covering thickness.

16. The vehicle interior component of claim 1, wherein the seam spacer is more compressible than the substrate and less compressible than the decorative covering.

17. The vehicle interior component of claim 1, wherein the decorative covering is adhesively attached to the substrate.

18. The vehicle interior component of claim 1, wherein the decorative skin layer and the foam inner layer are laminated or adhesively bonded together.

19. The vehicle interior component of claim 1, wherein the line of decorative stitching is not part of a functional seam in which two separate portions of covering material are joined.

* * * * *